UNITED STATES PATENT OFFICE.

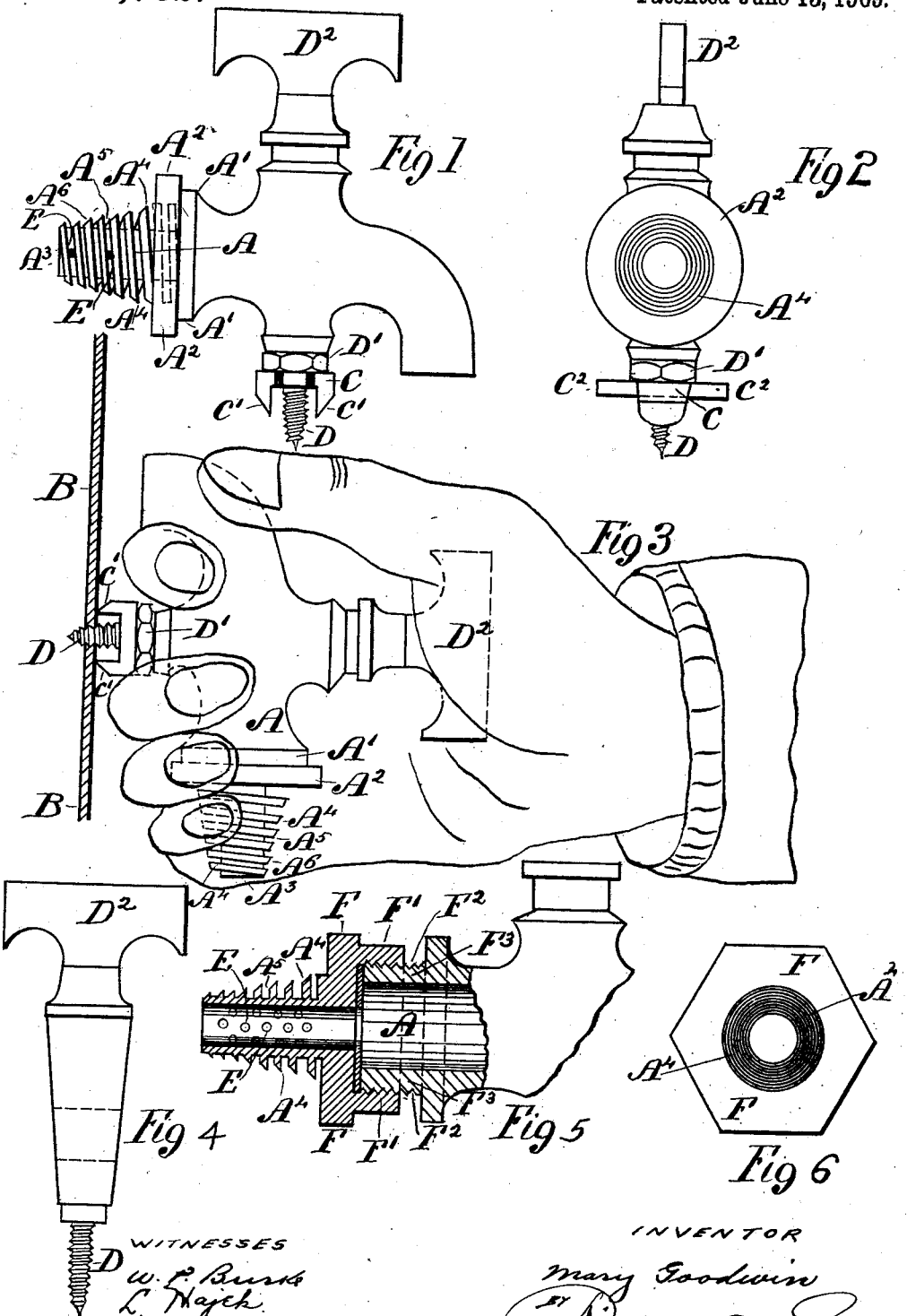

MARY GOODWIN, OF ERDINGTON, ENGLAND.

TAP FOR TANKS, OIL-DRUMS, AND THE LIKE.

No. 924,762.  Specification of Letters Patent.  Patented June 15, 1909.

Application filed January 4, 1907. Serial No. 350,851.

*To all whom it may concern:*

Be it known that I, MARY GOODWIN, a subject of the King of Great Britain and Ireland, residing at 247 George road, Erdington, near Birmingham, in the county of Warwick, England, have invented new and useful Improvements in and Relating to Taps for Tanks, Oil-Drums, and the Like, of which the following is a specification.

This invention relates to taps for tanks oil drums and the like, the chief object being to enable such taps to be secured in position in a more simple and inexpensive manner than heretofore while providing an efficient and water tight connection.

Referring to the drawings which form a part of this specification, Figure 1 represents a side elevation of my improved tap. Fig. 2 represents a back elevation. Fig. 3 represents a side view showing the method of cutting the hole in the side of the tank for the reception of the screw-ended spigot of the tap. Fig. 4 represents the plug of the tap in elevation. Fig. 5 represents in sectional side elevation a modification of my invention showing an adapter to adapt the conical screw portion—*i. e.* the spigot end—to a larger bore of tap. Fig. 6 is a back elevation of the adapter and spiral screw of the spigot end.

According to this invention the spigot A of the tap is provided with a screw threaded portion formed in such a manner that as the said spigot A is being screwed into a suitably formed hole in the tank or drum, a continually increasing gripping or bearing surface upon the interior of said tank or drum is afforded until a shoulder on the tap as at $A^1$ provided with a washer of leather $A^2$ or other suitable material is brought into contact with the outer surface of the tank or drum and a firm and water tight connection thereby obtained.

The screw threaded portion of the spigot A of the tap preferably comprises a spiral or screw whereof the distance of the outer edge from the axis of the spigot increases uniformly from the outer end of the spigot $A^3$ toward the shoulder $A^1$ on the tap, so that the outline of the thread $A^4$ has a tapering or conical appearance and the depth of the thread increases correspondingly as will be seen in the drawings. The periphery of each thread is beveled from front to back only and the walls thereof are parallel with each other and this arrangement provides the gripping action hereafter referred to, by presenting a square surface on the inner side of the thread so as to prevent any tendency to expand the hole formed in the tank which with a V or other thread would be the case. The groove $A^5$ between any two consecutive threads $A^4$ may be varied in width in accordance with the thickness of the material of which the tank or drum is composed.

The hole in the tank or drum—a sectional part of which is seen at B Fig. 3—is formed by means of any convenient boring or cutting device, but a disk such as *c* having two points turned down at right angles to the face of the disk at the periphery to form cutter-blades $C^1$ thereon is preferably employed and the disk is screwed by finger pieces $C^2$ to a tapered and pointed screw D formed on or attached to the lower end of the tap plug so that a separate boring or cutting device is unnecessary. The tap itself or the operating handle $D^2$ upon being turned forms the manipulating medium (see Fig. 3.)

$D^1$ is a washer or nut for use in connection with the attachment of the cutter disk C, $C^1$, $C^2$.

By forcing in the point of the cutting-screw D a purchase and start is obtained in the side of the tank or drum until by screwing onward either by turning the whole tap or the operating handle $D^2$ the cutters $C^1$ come into operation and by still screwing on, the necessary hole is bored in the side of the tank or drum as described. The diameter of the hole which is cut in the tank or drum is approximately equal to or is slightly greater than the external diameter of the free end $A^3$ of the spigot A and the beveled thread $A^4$ of the spigot is preferably so shaped by having a square surface on the inner side of the thread as described that it can produce a slit in the periphery of the hole as the spigot is being screwed therein. This slit allows of the beveled threads $A^4$, when those of larger diameter than the hole are reached in screwing in, to pass into or under said slit so that when finally screwed home in the tank or drum, the inner side of the hole around the spigot is completely packed by the gripping or bearing of the screw threads of larger diameter around the hole and by the overlapping of the same, thus making an absolutely tight connection on the inside and outside.

A suitable washer such as $A^2$, before referred to, or other form of packing material is provided against which the shoulder $A^1$ on the tap is pressed when the latter has been firmly secured to the tank or drum in the above manner.

A number of holes E may be formed in the spigot A of the tap or in the spigot of the adapter for facilitating the withdrawal of the contents of the vessel when the level of the contents falls below the level of the tap, and the vessel has to be tilted.

The above description refers to a conical spigot integrally a part of the tap, as will readily be understood, but I sometimes find it advantageous to make the spigot end separate from the tap. In this case I form the spigot end, which may be called an adapter, as shown clearly in Fig. 5, that is to say, with a screw threaded neck portion and shoulder F $F^1$, and I form corresponding threads $F^2$ on the tail piece $F^3$ of the tap, the two parts forming the tap upon being screwed together, with suitable washers intervening, if required, to make the connection water tight.
The conical screw threaded spigot A is precisely the same with regard to the screw threads as already described. The object and advantage of this form of adapter is to provide means whereby taps of different sizes of interior bore may be connected as required to an adapting spigot end of the kind described to suit a uniform or standard bore so that the said tap bodies are interchangeable as occasion may demand.

The adapter may be made of steel in special cases where great strength is required i. e. for heavy iron drums

Having now described my invention what I claim as new and desire to secure by Letters Patent is—

1. A tap for tanks and the like comprising a screw threaded portion having its threads each formed with parallel walls and having its periphery beveled from front to rear, and said threads increasing in diameter from the free end of the spigot so as to provide increasingly deep grooves between said threads.

2. In taps for tanks and the like in combination a separate spigot end having screw threads thereon, each thread having parallel walls and a beveled periphery, and the threads increasing in diameter from the free end of the spigot to the front, and a tap body adapted to be screwed to said spigot end.

In testimony whereof I have signed my name to this specification in the presence of two subscribing witnesses.

MARY GOODWIN.

Witnesses:
 EDWD. BURTON PAYNE,
 W. H. THORNBERY.